United States Patent
Kim

(10) Patent No.: US 10,303,319 B2
(45) Date of Patent: *May 28, 2019

(54) PATTERN OF ELECTRODES FOR A TOUCH SENSOR

(71) Applicant: Neodrón Limited, Dublin (IE)

(72) Inventor: Hyung-Gyu Kim, Gyeonggi-do Goyang-si (KR)

(73) Assignee: Neodrón Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/881,996

(22) Filed: Jan. 29, 2018

(65) Prior Publication Data

US 2018/0150158 A1    May 31, 2018

Related U.S. Application Data

(63) Continuation of application No. 13/931,181, filed on Jun. 28, 2013, now Pat. No. 9,880,674.

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
CPC ....... G06F 3/044; G06F 3/0416; G06F 3/0412
See application file for complete search history.

(56) References Cited

U.S. PATENT DOCUMENTS

| | | | |
|---|---|---|---|
| 7,663,607 B2 | 2/2010 | Hotelling et al. | |
| 7,864,503 B2 | 1/2011 | Chang | |
| 7,875,814 B2 | 1/2011 | Chen et al. | |
| 7,920,129 B2 | 4/2011 | Hotelling et al. | |
| 8,031,094 B2 | 10/2011 | Hotelling et al. | |
| 8,031,174 B2 | 10/2011 | Hamblin et al. | |
| 8,040,326 B2 | 10/2011 | Hotelling et al. | |
| 8,049,732 B2 | 11/2011 | Hotelling et al. | |
| 8,179,381 B2 | 5/2012 | Frey et al. | |
| 8,217,902 B2 | 7/2012 | Chang et al. | |
| 2007/0279395 A1* | 12/2007 | Philipp | G01R 27/2605 345/173 |
| 2008/0309635 A1 | 12/2008 | Matsuo | |
| 2009/0315854 A1 | 12/2009 | Matsuo | |
| 2010/0309162 A1* | 12/2010 | Nakanishi | G06F 3/044 345/174 |
| 2012/0018201 A1 | 1/2012 | Takakusaki | |

(Continued)

FOREIGN PATENT DOCUMENTS

WO    2012129247 A2    9/2012

OTHER PUBLICATIONS

Myers, S. A. et al., "Electronic Devices With Concave Displays," U.S. Appl. No. 61/454,936, filed Mar. 21, 2011, 23 pages.

(Continued)

*Primary Examiner* — Ibrahim A Khan

(74) *Attorney, Agent, or Firm* — Shami Messinger PLLC

(57) ABSTRACT

In certain embodiments, a touch sensor includes a first electrode and a second electrode. The second electrode is interleaved with the first electrode. The touch sensor further includes a third electrode. The third electrode surrounds the first electrode and the second electrode. The first, second, and third electrodes of the touch sensor form a capacitive node.

20 Claims, 7 Drawing Sheets

(56) References Cited

U.S. PATENT DOCUMENTS

| | | | |
|---|---|---|---|
| 2012/0044171 A1* | 2/2012 | Lee | G06F 3/0412 345/173 |
| 2012/0188201 A1* | 7/2012 | Binstead | G06F 3/041 345/174 |
| 2012/0242588 A1 | 9/2012 | Myers et al. | |
| 2012/0242592 A1 | 9/2012 | Rothkopf et al. | |
| 2012/0243151 A1 | 9/2012 | Lynch | |
| 2012/0243719 A1 | 9/2012 | Franklin et al. | |
| 2013/0076612 A1 | 3/2013 | Myers | |
| 2013/0181942 A1 | 7/2013 | Bulea et al. | |
| 2014/0225859 A1* | 8/2014 | Badaye | G06F 3/044 345/174 |

OTHER PUBLICATIONS

Lynch, S. B., "Electronic Devices With Convex Displays," U.S. Appl. No. 61/454,950, filed Mar. 21, 2011, 28 pages.

Rothkopf, F. R. et al., "Electronic Devices With Flexible Displays," U.S. Appl. No. 61/454,894, filed Mar. 21, 2011, 41 pages.

Kim, H., Non-Final Rejection, U.S. Appl. No. 13/931,181, dated Apr. 6, 2015, 25 pages.

Kim, H., Amendment after Non-Final Rejection, U.S. Appl. No. 13/931,181, dated Jul. 6, 2015, 13 pages.

Kim, H., Final Rejection, U.S. Appl. No. 13/931,181, dated Sep. 24, 2015, 29 pages.

Kim, H. Response after Final Rejection, U.S. Appl. No. 13/931,181, dated Mar. 24, 2016, 15 pages.

Kim, H., Non-Final Rejection, U.S. Appl. No. 13/931,181, dated Apr. 28, 2016, 31 pages.

Kim, H., Amendment after Non-Final Rejection, U.S. Appl. No. 13/931,181, dated Jul. 28, 2016, 13 pages.

Kim, H., Final Rejection, U.S. Appl. No. 13/931,181, dated Sep. 14, 2016, 34 pages.

Kim, H. Response after Final Rejection, U.S. Appl. No. 13/931,181, dated Dec. 14, 2016, 17 pages.

Kim, H., Advisory Action, U.S. Appl. No. 13/931,181, dated Jan. 18, 2017, 3 pages.

Kim, H., RCE, U.S. Appl. No. 13/931,181, dated Feb. 14, 2017, 1 page.

Kim, H., Non-Final Rejection, U.S. Appl. No. 13/931,181, dated Mar. 31, 2017, 35 pages.

Kim, H., Amendment after Non-Final Rejection, U.S. Appl. No. 13/931,181, dated Aug. 30, 2017, 16 pages.

Kim, H., Notice of Allowance, U.S. Appl. No. 13/931,181, dated Sep. 27, 2017, 7 pages.

* cited by examiner

PATTERN OF ELECTRODES FOR A TOUCH SENSOR

RELATED APPLICATION

This application is a continuation under 35 U.S.C. § 120 of U.S. application Ser. No. 13/931,181, filed Jun. 28, 2013 and entitled Pattern of Electrodes for a Touch Sensor, incorporated herein by reference.

TECHNICAL FIELD

This disclosure generally relates to touch sensors; and more particularly to patterns of electrodes for a touch sensor.

BACKGROUND

A touch sensor may detect the presence and location or a touch or the proximity of an object (such as a user's finger or a stylus) within a touch-sensitive area or the touch sensor overlaid on a display screen, for example. In a touch-sensitive-display application, the touch sensor may enable a user to interact directly with what is displayed on the screen, rather than indirectly with a mouse or touch pad. A touch sensor may no attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number or different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine the position of the change in capacitance on the touch screen.

The drawings included in the Figures are not drawn to scale.

DESCRIPTION OF EXAMPLE EMBODIMENTS

Figure 1:
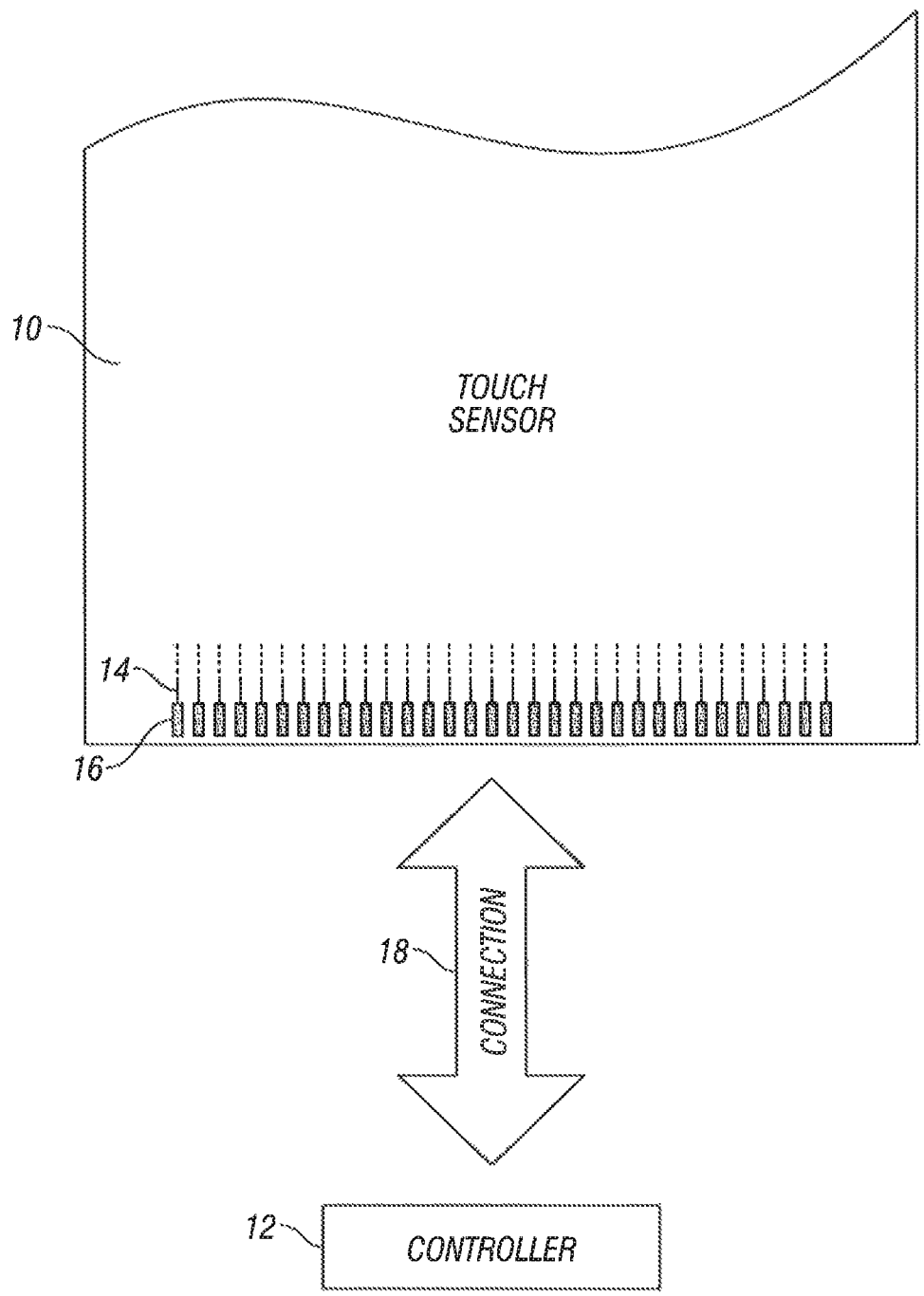
FIG. 1 illustrates an example touch sensor with an example touch-sensor controller that may be used in certain embodiments of the present disclosure.

FIG. 1 illustrates an example touch sensor 10 with an example touch-sensor controller 12, according to certain embodiments of the present disclosure. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may at least in part) be bounded by those cuts. In particular embodiments, the conductive material of an electrode may occupy approximately 100% of the area of its shape. As an example and not by way of limitation, an electrode may be made or indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor tray determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less. This disclosure contemplates electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a spare between them. A pulsed or alternation voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, change in capacitance may occur at the capacitive node and touch-sensor controller 12 may measure the change in capacitance. A touch may refer to an external object touching a capacitive node directly or touching a cover or substrate adjacent to the capacitive node. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in as pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. In some embodiments, this dielectric may be air. Moreover, this disclosure contemplates electrodes disposed on any suitable number of substrates.

As described above, a change in capacitance at a capacitive node of touch sensor 10 may indicate a touch or proximity input at the position of the capacitive node.

Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of much sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Certain embodiments of touch sensor 10 and touch-sensor controller 12 may measure capacitance or a change in capacitance using any suitable method. For example, voltage may be applied to one or more tracks 14 by opening or closing one or more switches associated with one or more tracks 14. Such switches may connect one or more tracks 14 to other portions of touch sensor 10 or touch-sensor controller 12 such as, for example, a voltage supply rail, ground, virtual ground, and/or any other suitable component. Such methods may cause charge to be transferred to or from one or more portions of tracks 14 one or more drive lines), which may induce a corresponding transfer of charge on one or more portions of one or more other tracks 14 (e.g., one or more sense lines). The presence of an object such as a finger or a stylus may change the amount of charge induced on the sensed track 14, and this change may be measured by touch-controller 12 to determine the position of the object.

Certain embodiments may perform measurements using any suitable number of steps that facilitate capacitance measurements. For example, some embodiments may perform any suitable combination of pre-charging one or more tracks 14, charging one or more tracks 14, transferring charge between two or more tracks 14, discharging one or more tracks 14, and/or any other suitable step. In some embodiments, a transfer of charge may be measured directly or indirectly. For example, certain embodiments may utilize voltage measurements, current measurements, timing measurements, any other suitable measurement, or any combination thereof to measure capacitance or a change in capacitance at one or more capacitive nodes 16. Furthermore, certain embodiments may utilize additional circuitry (such as, for example, one or more integrators, amplifiers, capacitors, switches, audio-to-digital converters, and/or any other suitable circuitry) to perform and/or enhance such measurements. Certain embodiments may measure a value at a particular point in time, measure a change in a value over time, and/or perform any other suitable processing to facilitate the determination of an object's position relative to touch sensor 10.

Figure 2:
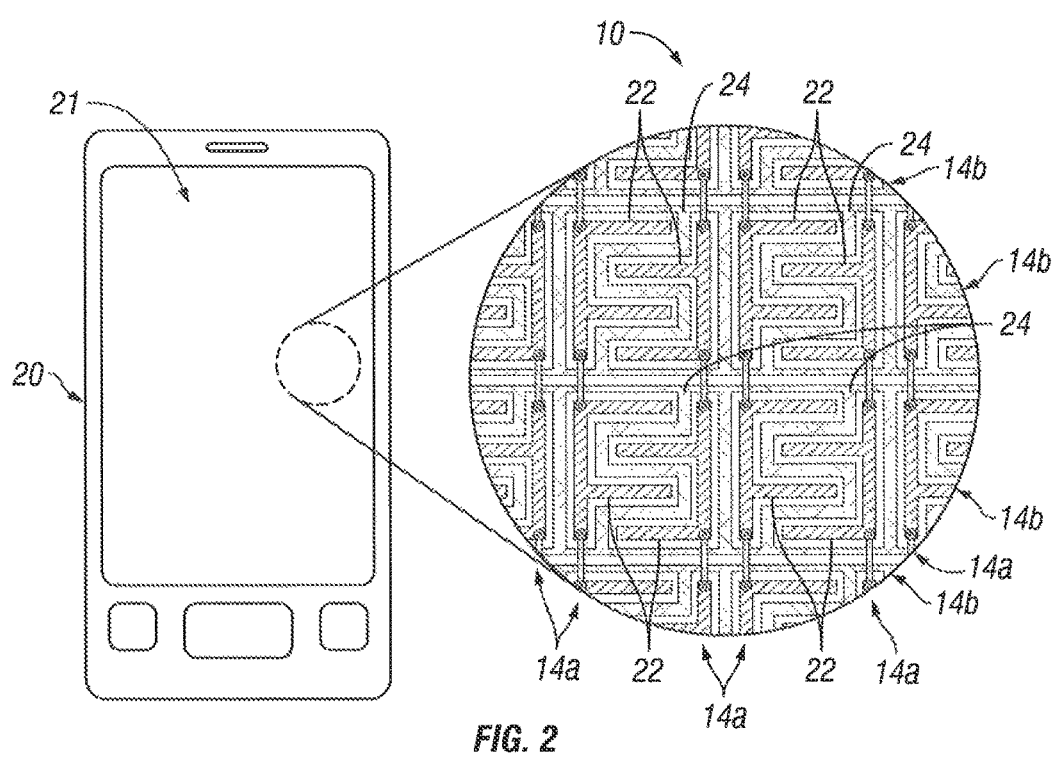
FIG. 2 illustrates an example device and example electrodes that may be used in certain embodiments of the present disclosure.

FIG. 2 illustrates an example device 20 and example electrode tracks 14 that may be used in certain embodiments of the present disclosure. In the illustrated embodiment, device 20 includes touch screen 10, which includes vertical tracks 14a and horizontal tracks 14b.

Device 20 may be any touch-sensing device or component. In various embodiments, device 20 may be a smart phone, tablet computer, laptop computer, or any suitable device utilizing a touch sensor 10. Device 20 may include a display 21 that may be overlaid by or otherwise positioned proximate to touch sensor 10. Display 21 and touch sensor 10 may be substantially planar, curved, or have any other suitable configuration.

Tracks 14a may include any structure, configuration, and/or function described above with respect to FIG. 1. In the illustrated embodiment, each track 14a includes a series of conductively connected electrodes 22 running vertically across display 21. Alternative embodiments may have series of electrodes 22 running horizontally or in any other suitable configuration. One or more tracks 14a may have voltage applied by touch-sensor controller 12 to perform touch-sensing. One or more tracks 14a may operate as a drive line or as a sense line to perform mutual capacitance sensing. One or more tracks 14a may also be used to perform other sensing methods based on the configuration of touch-sensor controller 12. Tracks 14a are described in further detail below with respect to FIG. 3A.

Tracks 14b may include any structure, configuration, and/or function described above with respect to FIG. 1. In the illustrated embodiment, each track 14b includes a single electrode 24 running horizontally across display 21. Alternative embodiments may have electrodes 24 running vertically or in any other suitable configuration. One or more tracks 14b may have voltage applied it by touch-sensor controller 12 to perform touch-sensing. One or more tracks 14b may operate as a drive line or as a sense line to perform mutual capacitance sensing. One or more tracks 14b may also used to perform other sensing methods based on the configuration of touch-sensor controller 12. Tracks 14b are described in further detail below with respect to FIG. 3B.

Electrodes 22 may be any component operable to conduct electricity to facilitate touch-sensing. Electrodes 22 may be composed of ITO, metal or any other suitable conductive material, or any suitable combination thereof. In the illustrated embodiment, each electrode 22 is formed approximately in the shape of a capital "F", and portions of each electrode 22 interleave with portions of an electrode 22 of an adjacent track 14. Other embodiments may utilize different shapes and/or sizes, as discussed in further detail below with respect to FIG. 3A. Such configuration may increase the amount of surface area on touch sensor 10 where drive and sense electrodes are positioned close to one another, which may improve the precision and/or linearity of touch-sensing operations.

Electrodes 24 may be any component operable to conduct electricity to facilitate touch-sensing. Electrodes 24 may be composed of ITO, metal or any other suitable conductive material, or any suitable combination thereof. In the illustrated embodiment, each electrode 24 crosses tracks 14a and surrounds (from a perspective orthogonal to the surface of touch sensor 10) an electrode 22 from each track 14a. Portions of electrode 24 may also pass between the interleaved segments of adjacent electrodes 22. Other embodiments may utilize different shapes and/or sizes, as discussed in further detail below with respect to FIG. 3B. In embodiments where one or more tracks 14a are driven while one or more tracks 14b are sensed, or vice versa, this configuration may increase the amount of surface area on touch sensor 10 where drive and sense electrodes positioned close to one another, which may improve the precision and/or linearity of touch-sensing operations.

Figure 3A:
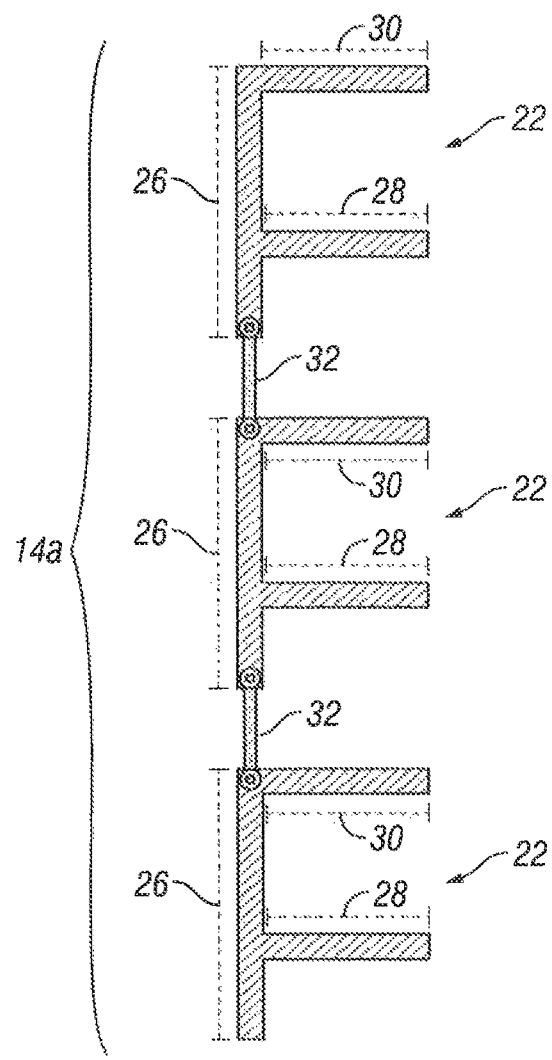
FIG. 3A illustrates an example series of electrodes that may be used in certain embodiments of a touch sensor.

FIG. 3A illustrates an example electrode track 14a that may be used in certain embodiments of a touch sensor 10. In the illustrated embodiment, electrode track 14a includes a series of electrodes 22 and conductive bridges 32. While track 14a is depicted as having a particular configuration of electrodes 22 and conductive bridges 32, any suitable configuration may be used. For example, each electrode 22 may be further broken down into two or more electrodes that are connected by another conductive bridge 32. As another example, electrodes 22 may be formed as a single continuous electrode rather than as separate electrodes 22 connected by conductive bridges 32.

Electrodes 22 may have any structure, configuration, and/or function described above with respect to FIG. 2. Because each electrode 22 is galvanically connected by a conductive bridge 32, applying voltage to any portion of track 14a may result in charging of each electrode 22. In the illustrated embodiment, each electrode 22 includes segments 26, 28, and 30. Segment 26 runs in the direction of the longitudinal axis of track 14a while segments 28 and 30 extend perpendicular to segment 26. The extension of segments 28 and 30 may increase the surface area where drive and sense electrodes are adjacent to one another, which may improve the precision and/or linearity of touch sensing. Furthermore, segments 28 and 30 may interleave with segments 28 and 30 of electrodes 22 of an adjacent track 14a (not shown in FIG. 3A), which may reduce the occurrence of low-sensitivity zones between adjacent capacitive nodes in certain embodiments. Segments 26, 28, and 30 may be any suitable length and width. In a particular embodiment, segments 26, 28, and 30 may have lengths of 3.8 mm, 2.3 mm, and 2.3 mm, respectively. In an alternative embodiment, segments 26, 28, and 30 may have lengths of 1.9 mm, 1.2 mm, and 1.2 mm, respectively. In other embodiments, segment 26 may be between 1.75 mm and 6 mm. Furthermore, in certain embodiments segments 28 and 30 may have the same length or different lengths.

Figure 3B:
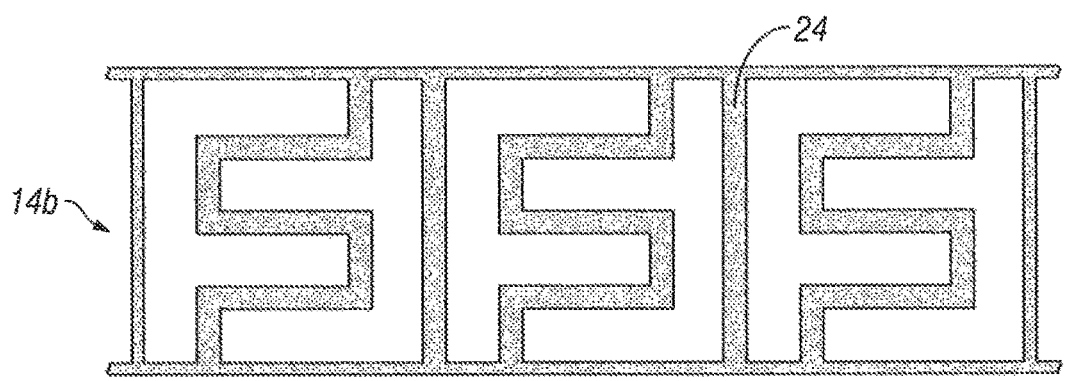
FIG. 3B illustrates an example electrode that may be used in certain embodiments of a touch sensor.

FIG. 3B illustrates an example electrode track 14b that may be used in certain embodiments of a touch sensor 10. In the illustrated embodiment, electrode track 14b includes electrode 24. While track 14b is depicted as using a particular configuration of electrode 24, any suitable configuration may be used. For example, in embodiments where electrodes 22 are not formed approximately in the shape of a capital "F", electrode 24 may be formed in any suitable shape to accommodate the shape of electrodes 22. As another example, some embodiments may use a series of electrodes 24 connected by a conductive bridge rather than a single, continuous electrode 24.

Electrode 24 may have any structure, configuration, and/or function described above with respect to FIG. 2. Electrode 24 may be formed to fit around one or more electrodes 22 (see, e.g., FIG. 4). This configuration may increase the surface area where sense and drive electrodes are adjacent to one another, which may improve the precision and/or linearity of touch sensing by reducing the area of touch sensor 10 where there is relatively low sensitivity. Such sensing improvements may be especially important when the external object whose position is being detected is relatively small compared to the size of the capacitive nodes of touch-sensor 10. For example, the precision and/or linearity of detecting the position of a stylus may be particularly improved where the tip of the stylus has a circumference that is smaller than the capacitive nodes of touch sensor 10. Such technical advantages are illustrated in further detail below with respect to FIGS. 5A-C and 6A-B.

Figure 4:
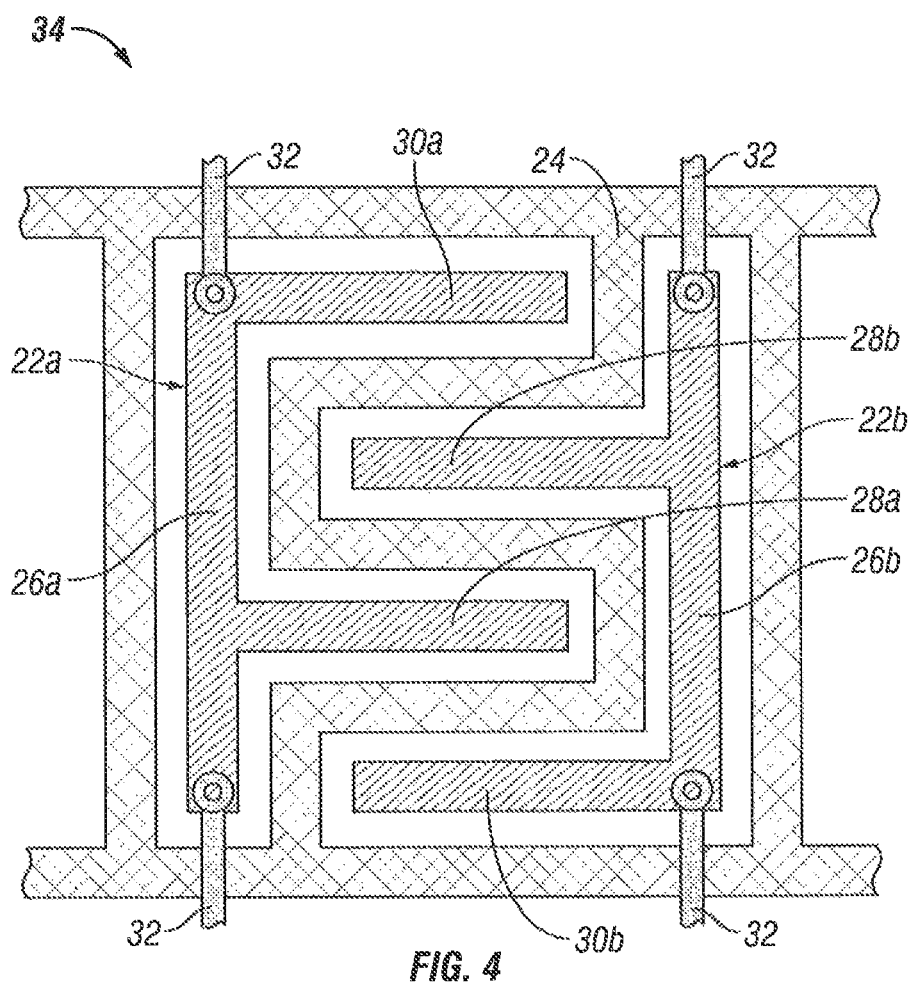
FIG. 4 illustrate an example capacitive node that may be used in certain embodiments of a touch sensor.

FIG. 4 illustrate an example capacitive node 34 that may be used in certain embodiments of a touch sensor 10. In the illustrated embodiment, capacitive node 34 includes electrodes 22 and 24, and capacitive node 34 may be connected to other capacitive nodes 34 by conductive bridges 32.

Capacitive node 34 may be any component operable to measure a change in capacitance caused by the presence of an external object. Capacitive node 34 may include any structure, configuration, and/or function described above with respect to FIG. 1. In the illustrated embodiment, capacitive node 34 includes electrodes 22a, 22b, and 24. In alternative embodiments, capacitive node 34 may include more or fewer electrodes. In various embodiments, one or more tracks 14a may be driven simultaneously and one or more tracks 14b may be sensed simultaneously (or vice versa), and the size, shape, and/or position of capacitive node 34 may be determined by the sensing operation performed. For example, in an embodiment where electrode 22a is driven while electrode 24 is sensed, capacitive node 24 may correspond to the area where electrode 24 is adjacent to electrode 22a. In an embodiment where electrodes 22a and 22b are both driven while electrode 24 is sensed, capacitive node 34 may correspond to full area shown in FIG. 4. Furthermore, in some embodiments, the same touch sensor 10 may utilize multiple configurations of capacitive node 34 at different times.

Electrodes 22a and 22b may have any structure, configuration, and/or function described above with respect to electrode 22 in FIGS. 2 and 3A. Electrode 22a includes segments 26a, 28a, and 30a; and electrode 22b includes segments 26b, 28b, and 30b. Front a perspective orthogonal to the surface of touch sensor 10, a portion of segment 28a extends between portions of segments 28b and 30b. Similarly, from a perspective orthogonal to the surface of touch sensor 10, a portion of segment 28b extends between portions of segments 25a and 30a. This interleaving of electrodes 22 may reduce the occurrence of low-sensitivity zones between adjacent electrode tracks, which may improve the precision and/or linearity of touch sensing operations. Segments 28 and 30 may be the same length or have different lengths. Segment 28 and/or segment 30 may be perpendicular or not perpendicular to segment 26. Furthermore, while in some embodiments, segments 26, 28, and/or 30 may be substantially straight; in other embodiments, segments 26, 28, and/or 30 may contain one or more curves.

Electrode 24 may have any structure, configuration, and/ or function described above with respect to electrode 24 in FIG. 2. As shown in FIG. 2, certain embodiments may have a small gap between electrodes 22 and 24 to facilitate capacitive coupling. This gap may simply be a space between electrodes 22 and 24, or it may be partially or completely filled by a dielectric material, any other suitable material to facilitate capacitive coupling, or any suitable combination thereof. Electrode 24 may partially or completely surround electrodes 22a and 22b (from a perspective orthogonal to the surface of touch sensor 10). By extending around and between electrodes 22 and 24, certain embodiments may increase the surface area of touch sensor 10 where drive and sense electrodes are adjacent. Since such areas have increased capacitive sensitivity such configurations may reduce the occurrence of low sensitivity areas and/or reduce the difference between the maximum sensitivity areas and minimum sensitivity areas on touch sensor 10.

Conductive bridge 32 may have any structure, configuration, and/or function described above with respect to FIG. 3A. In the illustrated embodiment, conductive bridges 32 allow, the electrodes 22 in a track 14a to be galvanically connected across electrodes 24 of tracks 14b. This configuration may be used in embodiments where electrodes 22 and 24 are disposed on the same substrate of touch sensor 10. In embodiments where electrodes 22 and 24 are disposed on separate substrates, conductive bridges 32 may not be used since the electrodes 22 of tracks 14a and electrodes 24 of tracks 14b such embodiments are formed on separate layers.

Figure 5A:
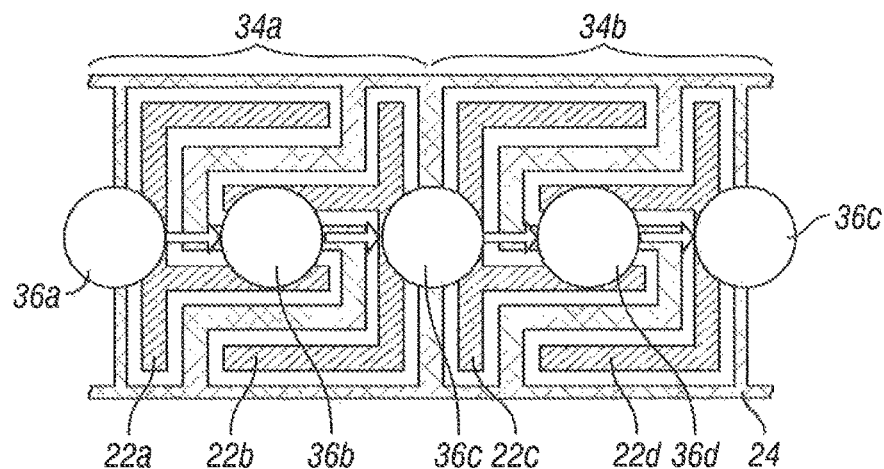
FIG. 5A illustrates example touch points on an example touch sensor.

FIG. 5A illustrates example touch points on an example touch sensor. Touch points 36a-36e depict the position of an object moving from left to right across capacitive nodes 34a and 34b.

Capacitive nodes 34a and 34b may include one or more components of touch sensor 10 that are operable to perform a capacitive measurement. For example, in the illustrated embodiment, capacitive node 34a includes electrodes 22a, 22b, and 24, and capacitive node 34b includes electrodes 22c, 22d, and 24. The elements making up a single capacitive node may be determined by which electrodes are driven and sensed at a particular time. While FIG. 5A depicts a particular configuration of capacitive nodes 34, any suitable configuration may be used. Capacitive measurements corresponding to capacitive nodes 34a and 34b are shown by measurements 40a and 40b, respectively, FIGS. 5B and 5C.

Touch points 36 represent a portion of an object touching or being positioned close to touch sensor 10 as the object moves laterally across touch sensor 10. For example, touch points 36 may represent the tip of a stylus or any other suitable object as it moves across capacitive necks 34a and 34b. The presence of the object at touch points 36a-36c may result in different capacitive measurements due to different sensitivities of various portions of capacitive nodes 34. The change in capacitance measured by touch-sensor controller 12 (relative to the capacitance when the object is not present) may be referred to as a "delta capacitance." In certain embodiments, delta capacitance may be a difference or a ratio between the capacitance value measured or expected when the object and not present and the capacitance value measured during the sensing sequence. Because the distance between the object and the capacitive node 34 may affect the change in capacitance experienced by the capacitive node 34, touch points 36a-36e may result in measurements having different delta capacitances. As used herein, "maximum delta" refers to the maximum delta capacitance measured as the object moves across capacitive nodes 34, which corresponds to touch points 36b and 36d in the illustrated embodiment. As used herein, "minimum delta" refers to the minimum delta capacitance measured as the object moves across capacitive nodes 34, which corresponds to touch points 36a, 36c, and 36e in the illustrated embodiment. The configuration of electrodes 22 and 24 may improve the sensitivity of certain portions touch sensor 10, which may increase the non-maximum delta capacitance values.

Figure 5B:
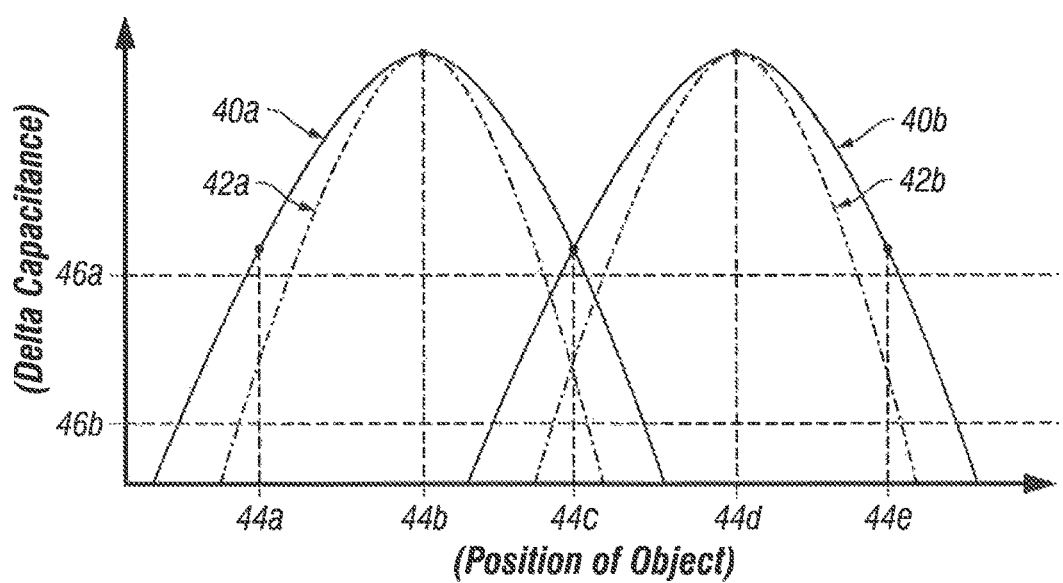
FIG. 5B illustrates a graph of example measurements that may be taken by certain embodiments of a touch sensor.

FIG. 5B illustrates a graph of example measurements that may be taken by certain embodiments of touch sensor 10. The illustrated graph depicts delta capacitance measurements taken as an object moves across touch sensor 10. The graph includes measurements 40a, 40b, 42a, and 42b; positions 44a-44e; and threshold values 46a and 46b.

Measurements 40*a* and 40*b* represent delta capacitance measurements taken as an object moves across touch sensor 10. Measurement 40*a* represents the measurement taken by capacitive node 34*a* of FIG. 5A. Measurement 40*b* represents the change in capacitance measured by capacitive node 34*b* of FIG. 5A. In the illustrated embodiment, this change in capacitance is shown as a difference between amplified measurements. For example, a sense line may be connected to an amplifier so that a value associated with the capacitance of the sense line may be amplified and detected. From this directly measured value (e.g., voltage, current, time, or any suitable value), a capacitance value may be determined. This capacitance value may then be compared to the capacitance value when the object is not presence, and the difference between these values may be measured as the delta capacitance. Since the values may depend on parameters of certain components (e.g., the amount of voltage applied to the drive line, the amount of time that the drive line is charged, the gain of the signal amplifier, or other parameters), other embodiments may experience different delta capacitance values. Furthermore, other embodiments may calculate the change in capacitance in any suitable manner.

Measurements 42*a* and 42*b* represent delta capacitance measurements taken as an object moves across certain prior art touch sensors. Measurements 42*a* and 42*b* are shown to illustrate a technical advantage of certain embodiments of the present disclosure over certain alternative touch sensors. Measurement 40*a* represents the measurement taken by a capacitive node that has a different configuration from but is comparable in size to capacitive node 34*a* of FIG. 5A. Measurement 40*b* represents the measurement taken by a capacitive node that has a different configuration from but is comparable in size to capacitive node 34*b* of FIG. 5A. In the illustrated embodiment, this change in capacitance is shown as a ratio of amplified measurements. Since the values may depend on parameters of certain components (e.g., the amount of voltage applied to the drive line, the amount of time that the drive line is charged, the gain of the signal amplifier, or other parameters), other embodiments may experience different delta values. Furthermore, other embodiments may calculate the change in capacitance in any suitable manner.

Positions 44*a*-44*c* represent particular positions of the object corresponding to touch points 36*a*-36*c*, respectively, of FIG. 5A. The delta capacitance measurements at positions 44*b* and 44*d* are maximum deltas, while the delta capacitance measurements at positions 44*a*, 44*c*, and 44*e* are minimum deltas. While delta capacitance at positions 44*b* and 44*d* may be the same for measurements 40*a* and 42*a* and for measurements 40*b* and 42*b*, delta capacitance at positions 44*a*, 44*c*, and 44*e* may be greater for measurements 40*a* and 40*b* than for measurements 42*a* and 42*b*. Thus, while certain embodiments may produce the same maximum delta as certain prior art touch sensors, certain embodiments may produce greater minimum deltas, thereby reducing the difference between the maximum and minimum deltas, which may improve touch sensor precision and/or linearity.

Threshold values 46*a* and 46*b* represent values set by certain touch-sensor controllers as a threshold to register a delta capacitance as a touch (or other presence) of the object. Threshold value 46*a* represents a threshold value for certain embodiments of the present disclosure that produce measurements 40*a* and 40*b*, while threshold value 46*b* represents a threshold value for certain prior art touch sensors that produce measurements 42*a* and 42*b*. For touch-sensor controller 12 to identify touches at the minimum sensitivity points of touch sensor 10, threshold value 46 may need to be set below the minimum delta value. Thus, increasing the minimum delta may allow threshold value 46 to be increased, which may improve touch sensor precision and/or linearity as explained further below with respect to FIG. 5C.

Figure 5C:
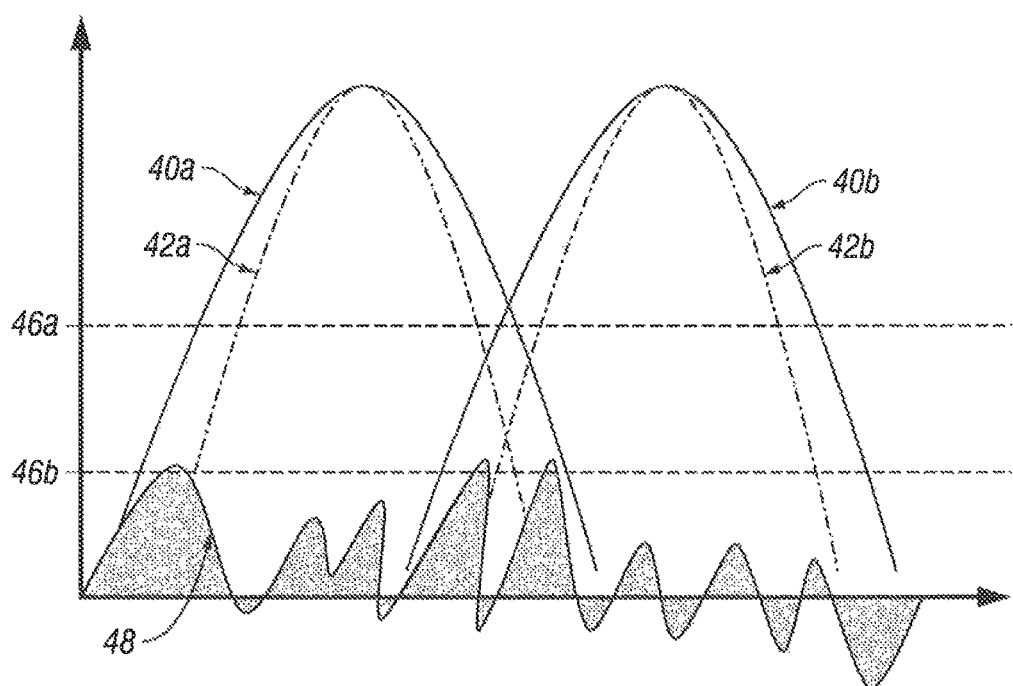
FIG. 5C illustrates a graph of example measurements and noise effects that may be measured by certain embodiments of a touch sensor.

FIG. 5C illustrates a graph of example measurements and noise effects that may be measured by certain embodiments of touch sensor 10. This graph includes measurements 40*a*, 40*b*, 42*a*, and 42*b*; threshold values 46*a* and 46*b*; and noise effects 48. As discussed above with respect to FIG. 5B, measurements 40*a* and 40*b* represent delta capacitance measurements of certain embodiments of touch sensor 10, while measurements 42*a* and 42*b* represent delta capacitance measurements of certain prior art touch sensors.

Noise effects 48 represent noise interference when performing touch-sensing methods. The amount of noise effects 48 may be dependent upon the particular environment in which touch sensor 10 is located. Noise interference may adversely affect the precision and/or linearity of touch-sensing operations. For example, if noise effect 48 happens to be above threshold value 46, touch-sensor controller 12 may not be able to distinguish between noise and an actual touch by the object. Raising threshold value 46 may therefore reduce the negative impact of noise interference on the accurate detection of touches. Thus, since certain embodiments may increase the minimum delta, thereby allowing threshold value 46 to be increased, such embodiments may reduce the occurrence of false positives. As another example, noise interference may prevent detection of legitimate touches by causing a delta capacitance measurement that would otherwise register as a touch to drop below a threshold value. Thus, by increasing minimum delta capacitance measurements, certain embodiments may reduce the number of false negatives where the delta capacitance measurement fails below a threshold value due to noise effects 48.

Figure 6A:
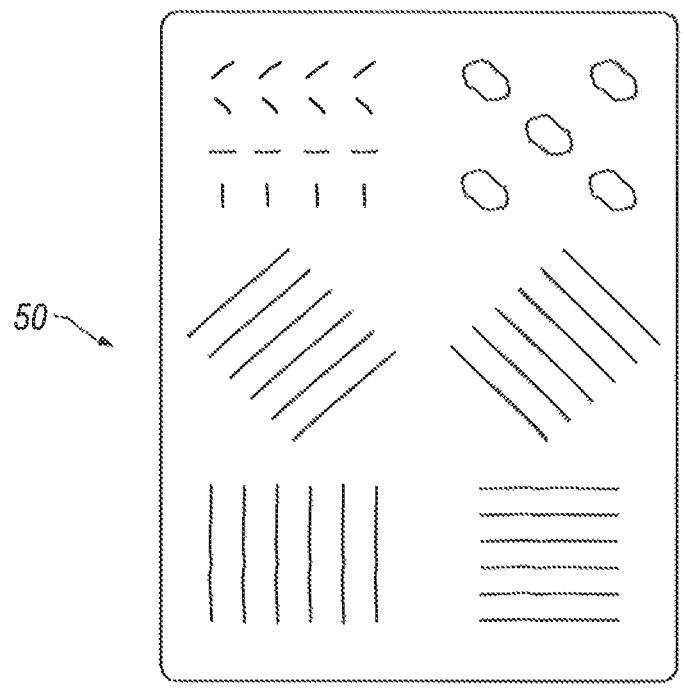
FIG. 6A illustrates example test drawings that may be registered by certain embodiments of a touch sensor.
Figure 6B:
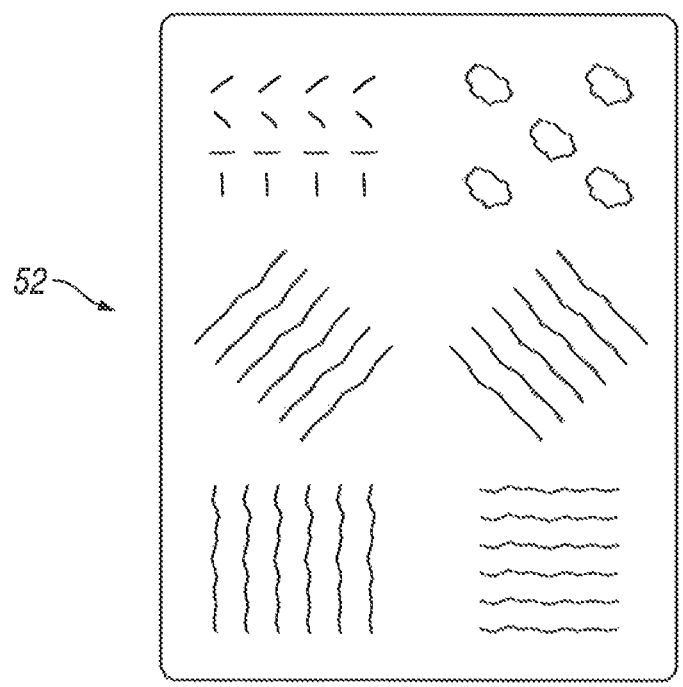
FIG. 6B illustrates example test drawings that may be registered by an alternative embodiment of a touch sensor.

FIG. 6A illustrates example test drawings 50 that may be registered by certain embodiments of touch sensor 10. Similarly, FIG. 6B illustrates example test drawings 52 that may be registered by certain prior art touch sensors, such as those that might produce measurements 42*a* and 42*b* of FIGS. 5B and 5C. Test drawings 50 and 52 represent the output of touch-sensing operations resulting from identical touch inputs by an object (e.g., a stylus). As discussed above, certain embodiments of the present disclosure may provide improved touch-sensing linearity. Such technical advantages are illustrated by the improved precision and linearity of the lines of test drawings 50 compared to test drawings 52.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. For example, while the embodiments of FIGS. 2, 3A-3B, 4, and 5A illustrate particular configurations of electrodes 22 and 24, any suitable number, type, and configuration may be used. As another example, while in certain embodiments electrodes 22 and 24 may be disposed on the same substrate or layer, other embodiments may have electrode 22 and 24 disposed on separate substrates or layers. As yet another example, while this disclosure describes certain touch-sensing operations that may be performed using the components of touch sensor 10 and touch-sensor controller 12, any suitable touch-sensing operations may be performed.

Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A touch sensor comprising: a first electrode;
a second electrode interleaved with the first electrode; and
a third electrode surrounding the first electrode and the second electrode, a portion of the third electrode extending between the first electrode and the second electrode;
wherein:
the first, second, and third electrodes form a capacitive node; and
the third electrode does not overlap the first electrode and the second electrode in a plan view.

2. The touch sensor of claim 1, further comprising:
a fourth electrode;
a fifth electrode interleaved with the fourth electrode;
a sixth electrode surrounding the fourth electrode and the fifth electrode, wherein the fourth, fifth, and sixth electrodes form a capacitive node;
a conductive bridge galvanically connecting the first and fourth electrodes to form a first electrode line; and
a conductive bridge galvanically connecting the second and fifth electrodes to form a second electrode line.

3. The touch sensor of claim 1, further comprising:
a fourth electrode; and
a fifth electrode interleaved with the fourth electrode;
wherein the third electrode surrounds the fourth and fifth electrode and the third, fourth, and fifth electrodes form a capacitive node.

4. The touch sensor of claim 1, wherein the first and second electrodes are configured to operate as drive electrodes of the touch sensor when the third electrode is configured to operate as a sense electrode of the touch sensor.

5. The touch sensor of claim 1, wherein the first and second electrodes are configured to operate as sense electrodes of the touch sensor when the third electrode is configured to operate as a drive electrode of the touch sensor.

6. The touch sensor of claim 1, wherein:
the first electrode is formed approximately in the shape of a capital F; and
the second electrode is formed approximately in the shape of an inverted capital F.

7. The touch sensor of claim 1, further comprising first and second substrates, wherein the first and second electrodes are disposed on the first substrate and the third electrode is disposed on the second substrate.

8. An apparatus comprising: a touch sensor comprising:
a first electrode;
a second electrode interleaved with the first electrode; and
a third electrode surrounding the first electrode and the second electrode, a portion of the third electrode extending between the first electrode and the second electrode; wherein:
the first, second, and third electrodes form a capacitive node; and
the third electrode does not overlap the first electrode and the second electrode in a plan view; and
a controller configured to:
apply voltage to a portion of the touch sensor;
measure a value associated with the portion of the touch sensor; and
determine a position of an object relative to the touch sensor based at least on the value.

9. The apparatus of claim 8, further comprising:
a fourth electrode;
a fifth electrode interleaved with the fourth electrode;
a sixth electrode surrounding the fourth electrode and the fifth electrode, wherein the fourth, fifth, and sixth electrodes form a capacitive node;
a conductive bridge galvanically connecting the first and fourth electrodes to form a first electrode line; and
a conductive bridge galvanically connecting the second and fifth electrodes to form a second electrode line.

10. The apparatus of claim 8, further comprising:
a fourth electrode; and
a fifth electrode interleaved with the fourth electrode;
wherein the third electrode surrounds the fourth and fifth electrode and the third, fourth, and fifth electrodes form a capacitive node.

11. The apparatus of claim 8, wherein the first and second electrodes are configured to operate as drive electrodes of the touch sensor when the third electrode is configured to operate as a sense electrode of the touch sensor.

12. The apparatus of claim 8, wherein the first and second electrodes are configured to operate as sense electrodes of the touch sensor when the third electrode is configured to operate as a drive electrode of the touch sensor.

13. The apparatus of claim 8, wherein:
the first electrode is formed approximately in the shape of a capital F; and
the second electrode is formed approximately in the shape of an inverted capital F.

14. The apparatus of claim 8, further comprising first and second substrates, wherein the first and second electrodes are disposed on the first substrate and the third electrode is disposed on the second substrate.

15. A device comprising: a touch sensor comprising:
a first electrode;
a second electrode interleaved with the first electrode; and
a third electrode surrounding the first electrode and the second electrode, a portion of the third electrode extending between the first electrode and the second electrode; wherein:
the first, second, and third electrodes form a capacitive node; and
the third electrode does not overlap the first electrode and the second electrode in a plan view:
a controller configured to:
apply voltage to a portion of the touch sensor;
measure a value associated with the portion of the touch sensor; and
determine a position of an object relative to the touch sensor based at least on the value; and
a display overlaid by at least a portion of the touch sensor.

16. The device of claim 15, further comprising:
a fourth electrode;
a fifth electrode interleaved with the fourth electrode;
a sixth electrode surrounding the fourth electrode and the fifth electrode, wherein the fourth, fifth, and sixth electrodes form a capacitive node;
a conductive bridge galvanically connecting the first and fourth electrodes to form a first electrode line; and
a conductive bridge galvanically connecting the second and fifth electrodes to form a second electrode line.

17. The device of claim 15, further comprising:
a fourth electrode; and
a fifth electrode interleaved with the fourth electrode;
wherein the third electrode surrounds the fourth and fifth electrode and the third, fourth, and fifth electrodes form a capacitive node.

18. The device of claim 15, wherein the first and second electrodes are configured to operate as drive electrodes of the touch sensor when the third electrode is configured to operate as a sense electrode of the touch sensor.

19. The device of claim 15, wherein the first and second electrodes are configured to operate as sense electrodes of the touch sensor when the third electrode is configured to operate as a drive electrode of the touch sensor.

20. The device of claim 15, wherein:
the first electrode is formed approximately in the shape of a capital F; and
the second electrode is formed approximately in the shape of an inverted capital F.

* * * * *